United States Patent
Lapergue et al.

(10) Patent No.: US 7,322,181 B2
(45) Date of Patent: Jan. 29, 2008

(54) TURBOFAN ENGINE WITH THE FAN FIXED TO A DRIVE SHAFT SUPPORTED BY A FIRST AND A SECOND BEARING

(75) Inventors: Guy Lapergue, Rubelles (FR); Regis Servant, Vigneux sur Seine (FR); Gael Bouchy, La Chapelle Iger (FR)

(73) Assignee: Snecma Moteurs, Paris (FR)

( * ) Notice: Subject to any disclaimer, the term of this patent is extended or adjusted under 35 U.S.C. 154(b) by 375 days.

(21) Appl. No.: 11/041,996

(22) Filed: Jan. 26, 2005

(65) Prior Publication Data

US 2005/0241290 A1 Nov. 3, 2005

(30) Foreign Application Priority Data

Feb. 6, 2004 (FR) .................................. 04 01146

(51) Int. Cl.
*F02K 3/02* (2006.01)
(52) U.S. Cl. ...................................... 60/226.1; 415/104
(58) Field of Classification Search ............... 60/791, 60/226.1; 415/104, 107, 229
See application file for complete search history.

(56) References Cited

U.S. PATENT DOCUMENTS

| 3,534,557 | A | * | 10/1970 | Adkin et al. ............... 60/226.1 |
|---|---|---|---|---|
| 5,237,817 | A | * | 8/1993 | Bornemisza et al. ........ 60/226.1 |
| 5,433,584 | A | * | 7/1995 | Amin et al. ................. 415/229 |
| 6,135,712 | A | * | 10/2000 | Chevrollier et al. ..... 415/216.1 |
| 6,428,269 | B1 | * | 8/2002 | Boratgis et al. ............... 415/9 |
| 6,619,030 | B1 | * | 9/2003 | Seda et al. .................. 60/226.1 |
| 6,622,473 | B2 | * | 9/2003 | Becquerelle et al. ........ 60/226.1 |
| 6,846,158 | B2 | * | 1/2005 | Hull .............................. 416/1 |
| 6,877,950 | B2 | * | 4/2005 | Liu ............................. 415/111 |
| 7,097,412 | B2 | * | 8/2006 | DiTomasso .................... 415/9 |
| 2002/0069637 | A1 | * | 6/2002 | Becquerelle et al. ........ 60/226.1 |
| 2004/0020186 | A1 | * | 2/2004 | Orlando et al. ............ 60/226.1 |
| 2004/0047731 | A1 | * | 3/2004 | Hull .............................. 416/1 |
| 2005/0022501 | A1 | * | 2/2005 | Eleftheriou et al. ........ 60/226.1 |
| 2005/0172610 | A1 | * | 8/2005 | Bart et al. .................. 60/226.1 |
| 2005/0241290 | A1 | * | 11/2005 | Lapergue et al. ........... 60/226.1 |
| 2005/0276683 | A1 | * | 12/2005 | Lapergue et al. .............. 415/9 |
| 2007/0006569 | A1 | * | 1/2007 | Brault et al. ............... 60/226.1 |

FOREIGN PATENT DOCUMENTS

| EP | 1 191 191 A2 | 3/2002 |
|---|---|---|
| FR | 2 831 624 | 5/2003 |

\* cited by examiner

*Primary Examiner*—William H. Rodriguez
(74) *Attorney, Agent, or Firm*—Oblon, Spivak, McClelland, Maier & Neustadt, P.C.

(57) ABSTRACT

The turbojet includes a fixed structure, a fan rotor fixed to a drive shaft supported by a first bearing and a second bearing. The second bearing is mounted on the fixed structure through a bearing support part. The first bearing is mounted on the fixed structure of the turbojet through a device enabling it to be decoupled from the fixed structure. The second bearing is mounted on the bearing support part through a link acting as a ball joint. The turbojet also allows axial displacements of the second bearing with respect to the fixed structure of the turbojet if the first bearing should be decoupled. The centering function of the second bearing after decoupling of the first bearing is thus provided without introducing excessive stresses in the bearing.

19 Claims, 5 Drawing Sheets

TURBOFAN ENGINE WITH THE FAN FIXED TO A DRIVE SHAFT SUPPORTED BY A FIRST AND A SECOND BEARING

BACKGROUND OF THE INVENTION

I. Field of the Invention

The invention relates to the field of turbojets and particularly turbofan engines with the fan fixed to a drive shaft that is supported by a first bearing and a second bearing.

This type of turbojet comprises, in order from the upstream side to the downstream side along the gas flow direction, a fan, one or several compressor stages, one or several turbine stages and a gas exhaust nozzle. The fan comprises a rotor provided with blades around its periphery which, when rotated, entrain air in the turbojet. The fan rotor is supported by the engine low pressure compressor shaft. It is centred on the centre line of the turbojet by a first bearing that is on the upstream side of a second bearing connected to the fixed structure, particularly the intermediate case.

In the remainder of the description, this shaft is referred to simply as the compressor shaft, since the fan is fixed to the compressor shaft, which is the low pressure rotor shaft in a twin shaft engine.

The first bearing is supported by a support part forming an enclosure around the compressor shaft, oriented towards the downstream side of the first bearing and fixed to a fixed structure of the turbojet. The second bearing is supported by a support part also fixed to a fixed structure of the turbojet.

II. Description of Related Art

A fan blade can be lost accidentally. This creates a large unbalanced mass on the compressor shaft which introduces loads and vibrations on the bearings, transmitted through their support parts to fixed structures of the turbojet, that can consequently be damaged.

The risk of excessive damage to the turbojet can be prevented by oversizing the structure, or by providing a decoupling system for the first bearing, as described in patent FR 2 752 024. The support part of the first bearing is fixed to the turbojet structure by so-called shear screws, in which there is a weakened portion at which the screws will break if excessive forces are applied. Thus, when an unbalanced mass appears on the compressor shaft, the forces induced on the first bearing are transmitted to the shear screws that break, decoupling the support part from the first bearing, and therefore the first bearing from the turbojet structure. Forces created by the unbalanced mass are no longer transmitted to the fixed structure of the turbojet through this support part.

However, the fan continues to rotate. The unbalanced mass causes bending of the compressor shaft that can cause displacement between the inner and outer bearing rings in the second bearing. Furthermore, bending of the shaft introduces a lever effect that applies stresses to the bearing rollers or balls. The result is possibly breakage of the second bearing.

Patent FR 2831624, also issued by the same applicant, describes a means in which the second bearing is mounted with a radial clearance in a reaming in the shroud support. The support of the second bearing is clamped by screws parallel to the shaft and that will fuse in shear. Consequently, the second bearing can be supported in the shroud support. This reduces the risk of friction.

BRIEF SUMMARY OF THE INVENTION

This invention is intended to guarantee the centering function of the second bearing after decoupling of the first bearing and to accompany the decoupling dynamics at the second bearing without introducing excessive stresses in the rollers.

To achieve this, the invention relates to a turbojet comprising a fixed structure, a fan rotor fixed to a drive shaft supported by a first bearing and a second bearing, mounted on the said structure fixed through a bearing support part, the first bearing being mounted on the fixed structure of the turbojet through a device that enables it to be decoupled from the fixed structure, characterised by the fact that the second bearing is mounted on the bearing support part through a link acting as a ball joint and in that the turbojet also comprises means enabling axial displacements of the second bearing with respect to the fixed structure of the turbojet if the first bearing should be decoupled.

Preferably, the second bearing comprising an outer bearing ring, the outer surface of the outer ring is spherical and matches an internal housing with a spherical shape, in the bearing support part.

According to another characteristic of the invention the turbojet also comprising means enabling radial displacements of the second bearing with respect to the fixed structure of the turbojet if the first bearing is decoupled.

In this case, the means enabling radial displacements preferably comprise shear screws for attachment of the bearing support part to the fixed structure of the turbojet.

Also preferably, the second bearing comprises an inner ring, an outer ring and rollers mounted between the said rings, and axial displacement between the inner ring and the outer ring is enabled.

Advantageously, the turbojet according to the invention also comprises means forming axial retention of the fan rotor and/or spare bearing, cooperating with means in the fixed structure and mounted fixed to the drive shaft.

Also advantageously, the turbojet includes a structural flange onto which the second bearing is fixed, the means forming axial retention of the fan and/or spare bearing comprise a retaining disk mounted on the drive shaft and cooperating with a stop disk of the ring for axial retention of the fan and a longitudinal sleeve of the ring to form the spare bearing.

Also advantageously, the means providing axial retention of the fan and/or the spare bearing are arranged to transmit axial forces directly to the drive shaft.

In this case, the second bearing advantageously comprises an inner ring, an outer ring and rollers mounted between the said rings, the retaining disk comprises radial teeth bearing axially on the teeth of the drive shaft and blocked in rotation by longitudinal teeth in the inner ring of the second bearing.

The invention is applicable particularly to a twin shaft turbojet in which the second bearing is a bearing supporting the low pressure rotor, but the applicant does not intend to limit the scope of his rights to this application.

BRIEF DESCRIPTION OF THE DRAWINGS

The invention will be better understood after reading the following description of a preferred embodiment of the turbojet according to the invention with reference to the attached drawings on which.

DETAILED DESCRIPTION OF THE INVENTION

Figure 1:
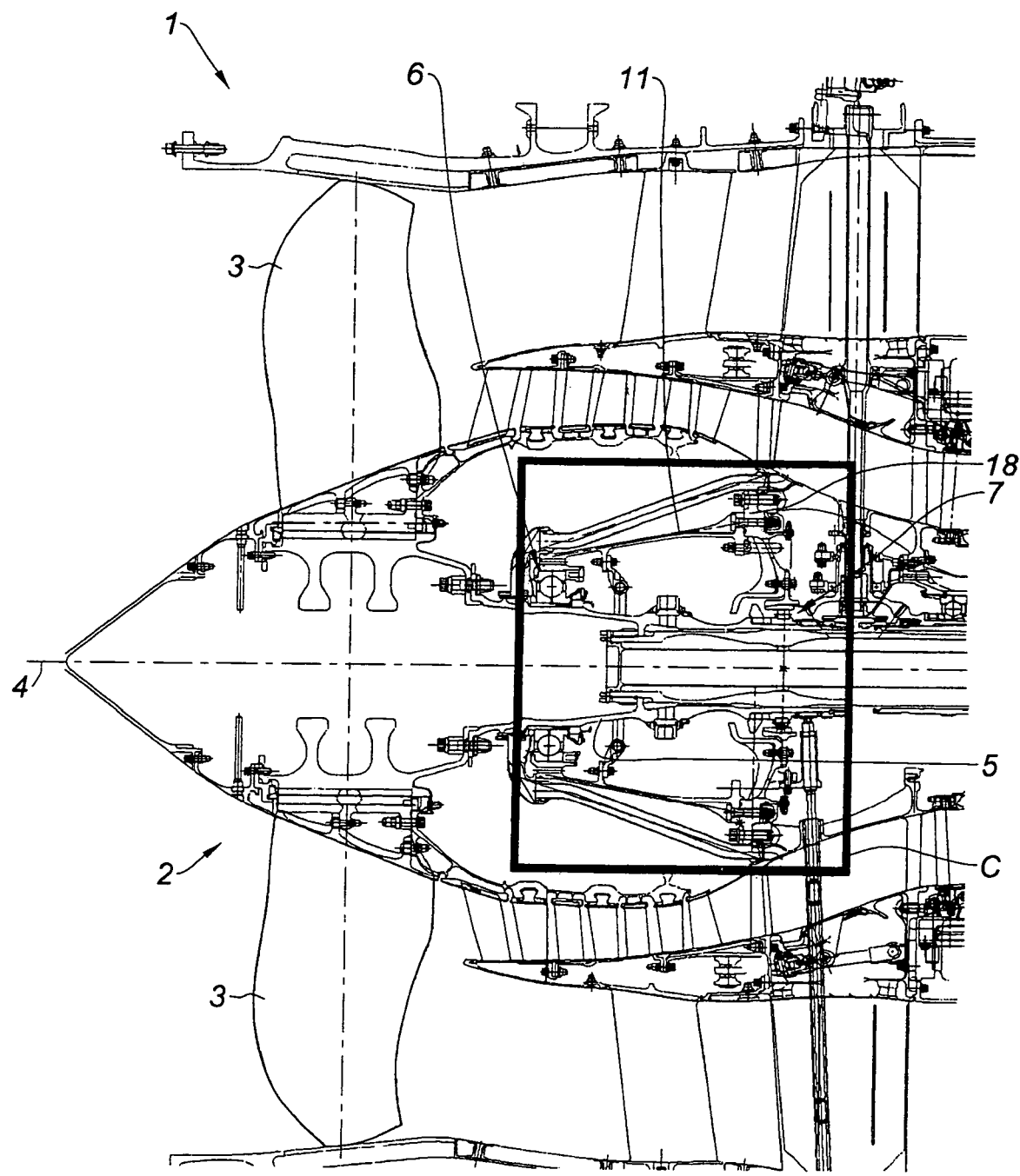
FIG. 1 shows an axial sectional side view of the preferred embodiment of the invention.

With reference to FIG. 1, the turbojet according to the invention comprises a fan 2, in which the rotor comprises blades 3 extending radially about the axis 4 of the turbojet. The fan shaft 2 is fixed on the downstream side of the blades 3 to the compressor shaft 5 which is globally cylindrical in shape. This is the low pressure compressor shaft. In the remainder of this description, the fan shaft 2 and compressor shaft 5 assembly will be referred to as the compressor shaft 5 or the drive shaft 5. The compressor shaft 5 is supported by a first bearing 6 and a second bearing 7 located on the downstream side of the first bearing 6.

Figure 2:
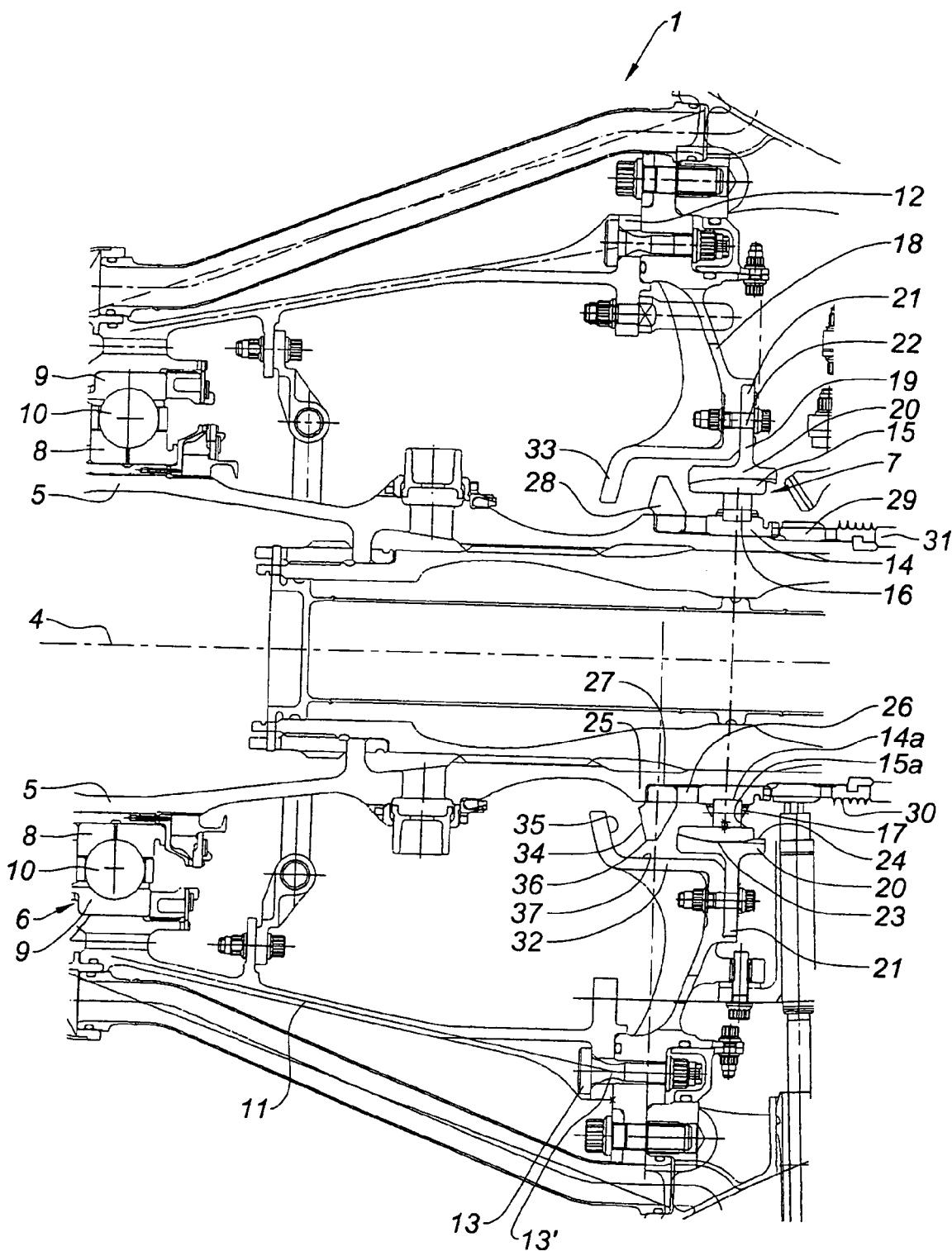
FIG. 2 shows an enlarged view of the area in FIG. 1 contained in box C.

With reference to FIG. 2, the first bearing 6 comprises an inner ring 8 and an outer ring 9, between which balls 10 are mounted. The inner ring 8 is fixed to the compressor shaft 5 and the outer ring is fixed to a support part of the bearing 11, subsequently referred to as the first bearing support 11. The balls 10 enable rotation of the inner ring 8, therefore the compressor shaft 5, with respect to the outer ring 9 and therefore with respect to the first bearing support 11.

The first bearing support 11 extends from the first bearing 6 in the downstream direction; it is globally cylindrical in shape, slightly conical, and its diameter increases in the downstream direction. It is mounted on a flange 18 on the fixed structure of the turbojet 1, and in particular is fixed to the intermediate case of the turbojet and is referred to in the following as the structural flange 18, through a downstream flange 12 into which the shear screws 13 are screwed. These shear screws 13 comprise a weakened portion 13' with a low tensile strength such that they break if excessive forces are applied, particularly when an unbalanced mass appears on the compressor shaft 5 particularly following loss of a blade 3.

The second bearing 7 comprises an inner bearing ring 14 and an outer bearing ring 15, between which the rollers 16 are mounted. The inner ring 14 is mounted fixed to the compressor shaft 5 and the outer ring 15 is mounted fixed to the fixed structure of the turbojet 1 during normal operating conditions, as will be described later. The rollers 16 are mounted parallel to the axis 4 of the turbojet 1, in a groove 14a extending around the circumference of the inner ring 14 and they are kept at a spacing from each other by a cage 17, well known to those skilled in the art. The rollers enable rotation of the inner ring 14 with respect to the outer ring 15, and therefore rotation of the shaft of compressor 5 with respect to the fixed structure of the turbojet 1 through these rings.

The second bearing 7 is supported by a bearing support part 19, subsequently denoted the second bearing support 19, comprising a housing 20 or a ring 20, that clamps the outer ring 15 of the second bearing 7, at the circumference of which an attachment flange 21 extends in the radial direction, screwed to the structural flange 18 by shear screws 22.

The outer ring 15 of the second bearing 7 comprises an outer surface 23, with a convex spherical shape as seen in an axial sectional view. This convex spherical surface 23 matches the concave spherical shape of the inner surface 24 of the ring 20 of the second bearing support 19. The two spherical surfaces, the convex surface 23 and the concave surface 24, cooperate to form a link forming a ball joint (23, 24). There are arranged such that during normal operation of the turbojet 1, the link forming the ball joint (23, 24) does not rotate. The outer ring 15 of the second bearing 7 is then fixed with respect to the second bearing support 19 and therefore to the fixed parts of the turbojet 1. Its behaviour if a blade 3 is lost will be described later.

The structure of elements of the turbojet 1 in the region of the second bearing 7 will be described by giving a description of the assembly of its elements, with reference to FIGS. 3 to 6, which will help to understand their arrangement.

Figure 3:
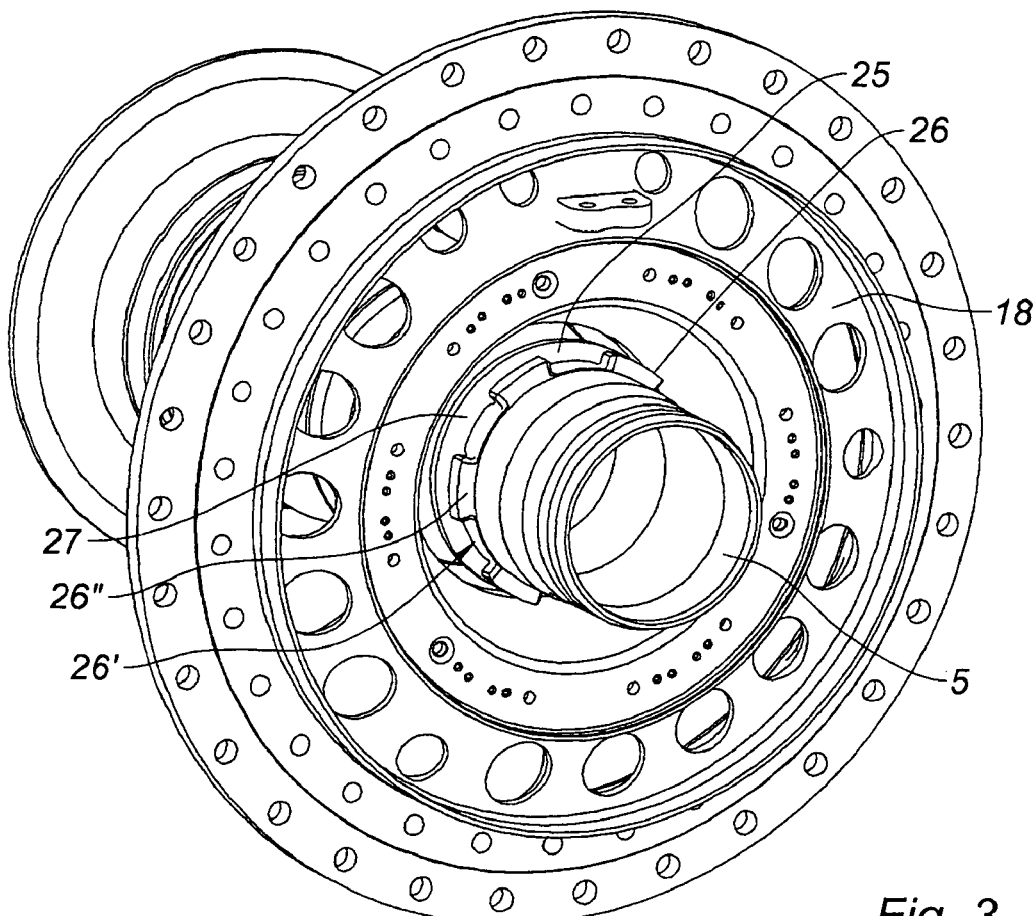
FIG. 3 shows a perspective back view of the compressor shaft and the structural flange of the preferred embodiment of the invention.

With reference to FIG. 3, the compressor shaft 5 comprises two projecting annular portions adjacent to the structural flange 18, on the upstream side 25 and the downstream side 26, forming an annular groove 27. The projecting portion 26 comprises radial notches 26', therefore forming teeth 26" between them. The teeth 26" and the notches 26' preferably have equal circumferential dimensions and therefore each category extends around half the circumference of the compressor shaft 5.

Figure 4:
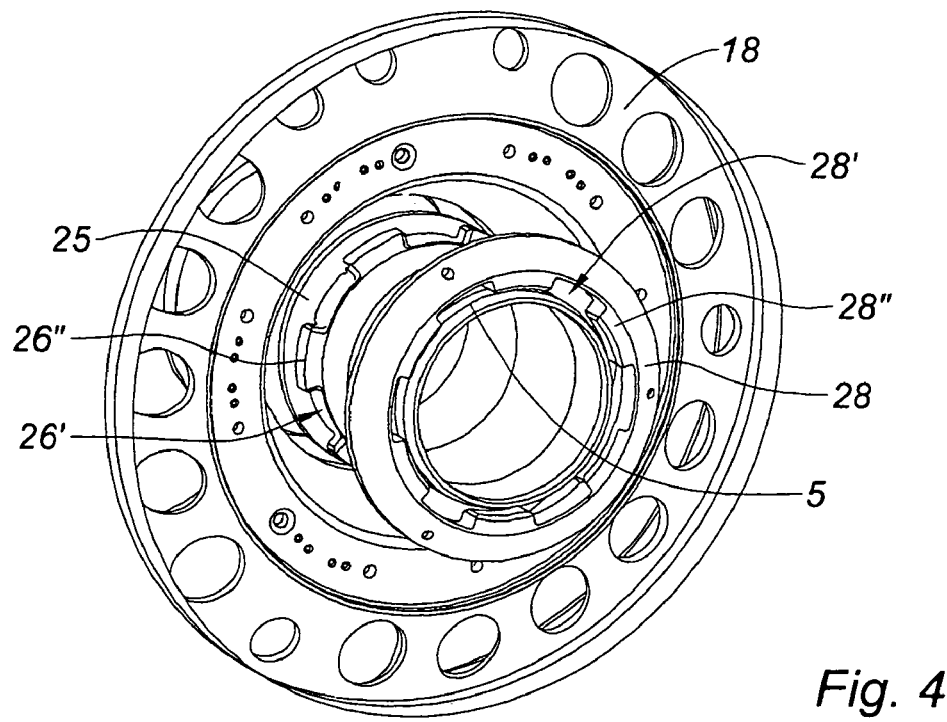
FIG. 4 shows an exploded perspective back view of a compressor shaft, the structural flange and the retaining ring in the preferred embodiment of the invention.

With reference to FIG. 4, a retaining disk 28 is mounted in the annular groove 27 of the compressor shaft 5. This retaining disk 28 comprises radial notches 28' and teeth 28" around its inner radial edge, with circumferential dimensions corresponding to the dimensions of the notches 26' and teeth 26" in the compressor shaft 5. During assembly, the retaining disk 28 is force fitted onto the compressor shaft 5 towards the upstream side; its teeth 28" are inserted in the notches 26' of the compressor shaft 5 until they stop in contact with the downstream surface of the annular portion projecting towards the upstream side 25 of the compressor shaft 5; the retaining disk 28 is then rotated around the axis 4 of the turbojet 1 until its teeth 28" are axially aligned with the teeth of the compressor shaft 5. In this position, they are clamped between the downstream surface of the annular portion projecting in the upstream direction 25 and the upstream surface of the teeth 26" of the compressor shaft 5, while the notches 26', 28' of the compressor shaft 5 and the retaining disk 28 are aligned in the axial direction.

Figure 5:
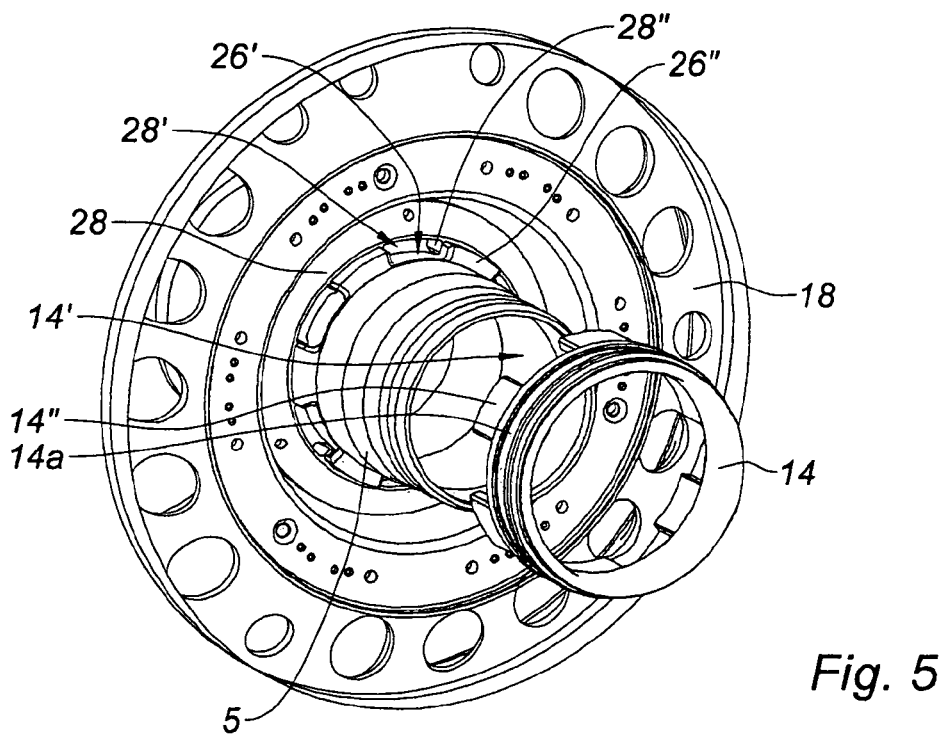
FIG. 5 shows an exploded perspective back view of the compressor shaft, the structural flange, the retaining ring and the inner ring of the second bearing in the preferred embodiment of the invention.

With reference to FIG. 5, the inner ring 14 of the second bearing 7 comprises longitudinal notches 14' and teeth 14" on its upstream portion, with circumferential dimensions that correspond to the circumferential dimensions of the notches 26', 28' and the teeth 26", 28" mentioned above. The inner ring 14 is force fitted onto the compressor shaft 5 and its teeth 14" are inserted into notches 26', 28' of the compressor shaft 5 and the retaining disk 28, until they stop in contact with the downstream surface of the annular portion of the compressor shaft 5 projecting in the upstream direction 25, the transverse surface of its notches 14' then stopping in contact with the teeth 26' of the compressor shaft 5. Thus, the teeth 14" of the inner ring 14 block the retaining disk 28 in rotation, and the teeth 28" of this disk stop in axial contact on the teeth 26" of the compressor shaft 5.

Figure 6:
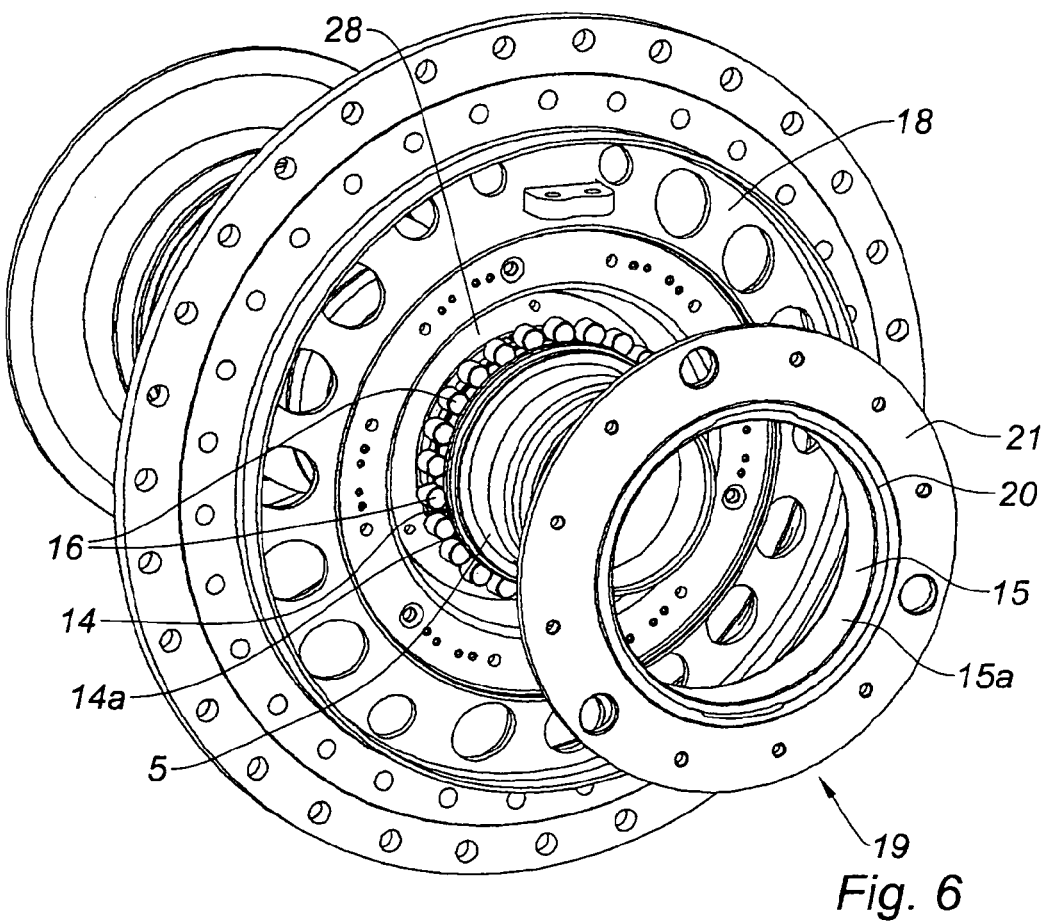
FIG. 6 shows an exploded perspective back view of the compressor shaft, the structural flange, the retaining ring, the inner ring of the second bearing and the second bearing support in the preferred embodiment of the invention.

With reference to FIG. 6, the rollers 16 are mounted on the inner ring 14, in the groove 14a provided for this purpose; the cage 17 holding them in place with respect to the others is not shown. The outer ring 15 of the second bearing 7, mounted in the second bearing support 19, is force fitted around the rollers 16; the inner surface 15a of the outer ring 15 is straight as seen in an axial sectional view, with a longitudinal dimension greater than the longitudinal dimension of the rollers 16. The flange 21 of the second bearing support 19 is fixed to the structural flange 18 by shear screws 22.

Figure 7:
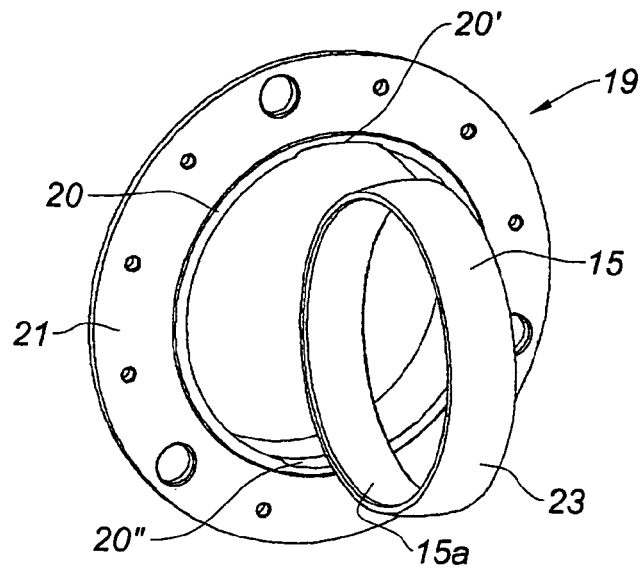
FIG. 7 shows a diagrammatic perspective view of the assembly of the outer ring in the support of the second bearing in the preferred embodiment of the invention.

The assembly of the outer ring 15 of the second bearing 7 in the ring 20 of the second bearing support 19 will now be explained with reference to FIG. 7, and forms the link forming the ball joint (23, 24). The ring 20 of the second bearing—support 19 comprises two assembly—notches 20', 20", diametrically opposite to each other, for which the circumferential dimension corresponds to the longitudinal dimension of the outer ring 15 of the second bearing 7. The side of the outer ring 15 is shown facing the second bearing support 19 and is slid into its notches 20', 20". It is then rotated by 90° such that its outer surface 23 bears in contact on the inner surface 24 of the ring 20 of the second bearing support 19 and thus forms the link acting as a ball joint (23, 24).

Other elements can be force fitted onto the compressor shaft 5 on the downstream side of the inner ring 14 of the second bearing 7. For example in this case, with reference to FIGS. 1 and 2, a power take off system 29 is provided to drive other elements through movement of the compressor shaft 5, together with a rotating air seal. Once all elements have been force fitted, the assembly is locked in the axial direction by a lock nut 31.

Figure 8:
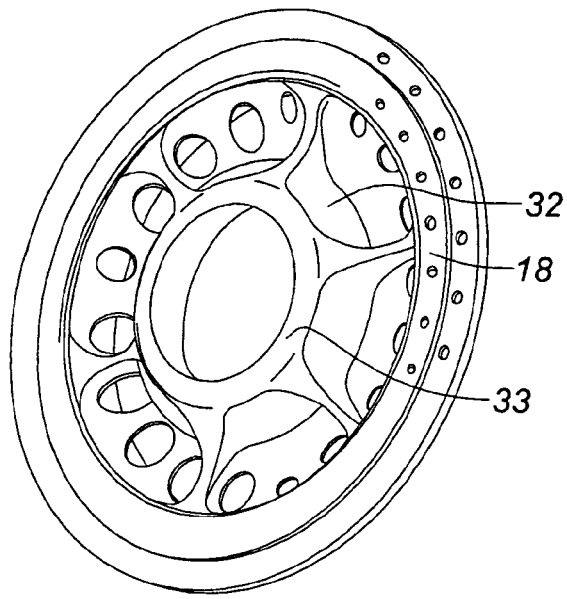
FIG. 8 shows a perspective view of the structural flange in the preferred embodiment of the invention.
Figure 9:
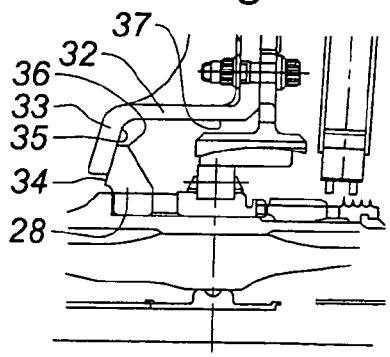
FIG. 9 shows a diagrammatic sectional side view through the second bearing in the preferred embodiment of the invention, after the compressor shaft has broken.

With reference to FIG. 8, the structural flange 18 is drilled at its centre. It includes a longitudinal sleeve 32 in its central part, and a stop disk 33 extends continuously and radially inwards at the upstream end of this longitudinal sleeve, the inner edge of the stop disk forming the central bore of the flange 18. The stop disk 33 is arranged such that the upstream surface 34 of the retaining disk 28 can bear in contact with its downstream surface 35. The contact surfaces 34, 35 formed by these two surfaces 34, 35 are arranged in a complementary manner such that one can bear on the other as uniformly as possible. In the embodiment of the turbojet 1 according to the invention described herein, the contact surfaces 34, 35 are conical in shape. These contact surfaces could also be planar, or better spherical. The function of the stop disk 33 is to block the compressor shaft 5 in the axial direction in the case of breakage, so that the fan 2 that is fixed to it is not entrained forwards, as will be described later.

We will now describe operation of the turbojet 1 according to the invention when a blade 3 of the fan 2 is lost, in more detail.

The loss of a blade 3 creates an unbalanced mass on the compressor shaft 5. The forces induced break the shear screws 13 fixing the first bearing support 11 onto the structural flange 18, and decouple the support 11 from the fixed structure of the turbojet 1.

The second bearing 7 is not necessarily decoupled from the fixed structure of the turbojet 1, since the link forming the ball joint (23, 24) is capable of absorbing a certain amount of bending of the compressor shaft 5. We have already seen that the outer ring 15 of the second bearing 7 matches the ring 20 of the second bearing support 19 such that the link thus formed and forming the ball joint (23, 24) does not pivot during normal operation of the turbojet 1, but is free to pivot if there is an unbalanced mass on the compressor shaft 5. Thus, bending of the compressor shaft 5 causes rotation of the link forming a ball joint (23, 24) around the centre of the sphere defined by the spherical surfaces, 23, 24 from which the link is made.

However, if bending of the compressor shaft 5 is too severe, and if this bending cannot be absorbed by simple rotation of the link forming a ball joint (23, 24), for example particularly if bending is offset with respect to the axis 4 of the turbojet 1, the shear screws 22 fixing the second bearing support 19 to the structural flange 18 will break. This break will enable radial displacements of the second bearing 7 and its support 19.

Furthermore, longitudinal displacements are enabled by axial sliding of the rollers 16 on the internal surface 15a of the outer ring 15 of the second bearing 7, the longitudinal dimension of which is greater than the longitudinal dimension of the rollers 16.

Thus, according to the invention, the decoupling dynamics of the first bearing 6 is enabled at the second bearing 7, without introducing excessive stresses on the rollers 16, since radial, longitudinal and angular displacements are enabled at the second bearing 7. Part movements are not hindered. Rotation takes place about a centre of rotation located above the attachment points 13 of the first bearing support.

However, if the rollers 16 should break, the outer radial surface 36 of the retaining disk 28 stops in contact with the inner surface 37 of the longitudinal sleeve 32 of the flange 18; the disc and the sleeve thus act as an spare bearing. If this function is required for this disk 28 and this sleeve 32, the radial distance between the outer surface 36 of the retaining disk 28 and the inner surface 37 of the longitudinal sleeve 32 may be sized accordingly.

However, it is possible for the compressor shaft 5 to break, despite the various safety devices described above. A final safety device is provided to allow for this. If the compressor shaft 5 breaks, rotation of the fan 2 will entrain the fan and the compressor shaft 5 with which it is fixed in the forward direction. The upstream surface 34 of the retaining disk 28 then stops in contact with the downstream surface 35 of the stop disk 33 fixed to the fixed structure of the turbojet 1. The stop disk 33 therefore acts as an axial stop function for the fan 2 if the compressor shaft 5 (or the turbine shaft to which the compressor shaft 5 is fixed) should break. The advantage of a spherical shape for the contact surface 34 of the retaining disk 28 and for the contact surface 35 of the stop disk 33, is very clear in this case; it enables uniform contact regardless of the inclination of the compressor shaft 5 with respect to the structural flange 18 at the time of contact.

At and after contact, the forces are transmitted through the retaining disk 28 to its teeth 28" that transmit these forces to the teeth 26" of the compressor shaft 5, and therefore to the compressor shaft 5. Thus, due to the arrangement of the retaining disk 28 and the inner ring 14 of the second bearing 7 on the compressor shaft 5, the forces at the stop disk 33 for axial retention of the fan 2 are not transmitted to the lock nut 31; if they were, the consequences would be disastrous since breakage of the lock nut 31 would cause sliding of the various elements force fitted around the compressor shaft 5 and expulsion of the fan 2 and the compressor shaft 5 in the forwards direction; instead, these forces are transmitted to the compressor shaft 5.

Therefore, the device according to the invention provides a means of assuring that the compressor shaft 5 and therefore the fan shaft 2, are retained in the axial direction at the second bearing 7, without transmission of any retaining forces to the lock nut 31 of the second bearing 7.

The invention claimed is:

1. A turbojet, comprising:
a fixed structure;
a fan rotor fixed to a drive shaft supported in a first configuration by a first bearing and a second bearing, located downstream from the first bearing in a gas flow direction, and supported in a second configuration by the second bearing; and
means for enabling an axis of the second bearing to be displaced with respect to an axis of the fixed structure of the turbojet in the second configuration, wherein
the first bearing is mounted on the fixed structure of the turbojet through a device that enables the first bearing to be decoupled from the fixed structure, and
the second bearing is mounted on the fixed structure through a bearing support part including a link acting as a ball joint.

2. The turbojet according to claim 1, wherein
the second bearing includes an outer bearing ring in the bearing support part, and
an outer surface of the outer bearing ring is spherical and matches a spherical internal housing in the bearing support part.

3. The turbojet according to claim 1, further comprising:
means for enabling radial displacement of the second bearing with respect to the fixed structure of the turbojet in the second configuration.

4. The turbojet according to claim 3, wherein the means for enabling radial displacement includes shear screws for attachment of the bearing support part to the fixed structure of the turbojet.

5. The turbojet according to claim 1, wherein
the second bearing includes an inner ring, an outer rings and rollers mounted between the inner ring and the outer ring, and
the inner ring is configured to be longitudinally displaced with respect to the outer ring.

6. The turbojet according to claim 1, further comprising:
means for forming axial retention of the fan rotor in cooperation with the fixed structure.

7. The turbojet according to claim 6, further comprising:
a structural flange onto which the second bearing is fixed, wherein the means for forming axial retention of the fan rotor includes a retaining disk mounted on the drive shaft configured to cooperate with a disk acting as a stop disk for the structural flange for axial retention of the fan rotor arid a longitudinal sleeve of the flange to form a spare bearing.

8. The turbojet according to claim 6, wherein the means for forming axial retention of the fan rotor is configured to transmit axial forces directly to the drive shaft.

9. The turbojet according to claim 7, wherein
the second bearing includes an inner ring, an outer ring, and rollers mounted between the inner ring and the outer ring, and the retaining disk includes radial teeth bearing axially on teeth of the drive shaft and blocked in rotation by longitudinal teeth in the inner ring of the second bearing.

10. The turbojet according to claim 1, wherein
the drive shaft is a low pressure rotor, and
the second bearing is configured to support the low pressure rotor.

11. A turbojet, comprising:
a fixed structure;
a drive shaft coupled to the fixed structure;
a fan rotor fixed to the drive shaft;
a first bearing configured to couple the fixed structure and the drive shaft; and
a second bearing located downstream from the first bearing in a gas flow direction, the second bearing configured to couple the fixed structure and the drive shaft,
wherein an outer surface of the second bearing is coupled to an inner surface of the fixed structure such that an axis of the second bearing is configured to be displaced with respect to an axis of the fixed structure.

12. The turbojet according to claim 11, wherein
the fixed structure includes a bearing support part,
the second bearing includes an outer bearing ring, and
an outer surface of the outer bearing ring is spherical and contacts a spherical internal housing in the bearing support part.

13. The turbojet according to claim 12, wherein
the bearing support part is coupled to another portion of the fixed structure via shear screws, and
the shear screws are configured to enable radial displacement of the second bearing with respect to the fixed structure of the turbojet.

14. The turbojet according to claim 11, wherein
the second bearing includes an inner ring, an outer ring, and rollers mounted between the inner ring and the outer ring, and
the inner ring is configured to be longitudinally displaced with respect to the outer ring.

15. The turbojet according to claim 11, wherein the fixed structure includes a sleeve configured to axially retain the fan rotor after the fan rotor is decoupled from the drive shaft.

16. The turbojet according to claim 15, further comprising:
a retaining disk mounted on the drive shaft,
wherein, after the fan rotor is decoupled, the retaining disk is configured to contact the sleeve to axially retention the fan rotor.

17. The turbojet according to claim 16, wherein the retaining disk is configured to transmit axial forces directly to the drive shaft.

18. The turbojet according to claim 16, wherein
the second bearing includes an inner ring, an outer ring, and rollers mounted between the inner ring and the outer ring, and
the retaining disk includes radial teeth bearing axially against teeth of the drive shaft and blocked in rotation by longitudinal teeth in the inner ring of the second bearing.

19. The turbojet according to claim 11, wherein
the drive shaft is a low pressure rotor, and
the second bearing is configured to support the low pressure rotor.

* * * * *

UNITED STATES PATENT AND TRADEMARK OFFICE
CERTIFICATE OF CORRECTION

PATENT NO. : 7,322,181 B2 Page 1 of 1
APPLICATION NO. : 11/041996
DATED : January 29, 2008
INVENTOR(S) : Guy Lapergue et al.

It is certified that error appears in the above-identified patent and that said Letters Patent is hereby corrected as shown below:

Column 7, line 57, change "arid" to -- and --.

Signed and Sealed this

Twelfth Day of August, 2008

JON W. DUDAS
*Director of the United States Patent and Trademark Office*